US009610675B2

(12) United States Patent
Southwell (10) Patent No.: US 9,610,675 B2
(45) Date of Patent: Apr. 4, 2017

(54) CLAMP SYSTEM FOR WELDING APPLICATIONS

(71) Applicant: Steven Arthur Southwell, Bloomingdale, IL (US)

(72) Inventor: Steven Arthur Southwell, Bloomingdale, IL (US)

(73) Assignee: NU-WAY INDUSTRIES, INC, Des Plaines, IL (US)

( * ) Notice: Subject to any disclaimer, the term of this patent is extended or adjusted under 35 U.S.C. 154(b) by 136 days.

(21) Appl. No.: 14/533,451

(22) Filed: Nov. 5, 2014

(65) Prior Publication Data

US 2015/0123332 A1     May 7, 2015

Related U.S. Application Data

(60) Provisional application No. 61/900,756, filed on Nov. 6, 2013.

(51) Int. Cl.
| | |
|---|---|
| *B62D 65/18* | (2006.01) |
| *B62D 65/04* | (2006.01) |
| *B25B 5/00* | (2006.01) |
| *B23K 37/04* | (2006.01) |
| *B25B 5/14* | (2006.01) |

(52) U.S. Cl.
CPC .......... *B25B 5/003* (2013.01); *B23K 37/0435* (2013.01); *B25B 5/142* (2013.01); *B62D 65/04* (2013.01); *B62D 65/18* (2013.01)

(58) Field of Classification Search
CPC .... B23K 11/36; B23K 37/04; B23K 37/0408; B23K 37/0435; B23K 37/0443; B23K 37/0461; B23K 37/053; B23P 19/04; B25B 1/00; B25B 1/2489; B25B 11/02; B25B 5/00; B25B 5/006; B25B 5/061; B25B 5/068; B25B 5/166; B25B 7/00; B62D 65/18; B62D 65/026; B62D 65/04
See application file for complete search history.

(56) References Cited

U.S. PATENT DOCUMENTS

| | | | |
|---|---|---|---|
| 3,094,318 A | * | 6/1963 | Frydenberg ............. B25B 5/061 144/307 |
| 3,424,319 A | * | 1/1969 | Darash ................... B23Q 3/082 198/341.02 |

(Continued)

FOREIGN PATENT DOCUMENTS

KR    WO 2011059167 A1 *  5/2011  .......... B25J 15/0052

*Primary Examiner* — Joseph J Hail
*Assistant Examiner* — Tyrone V Hall, Jr.

(57) ABSTRACT

A welding clamp system using a fixture plate with a bulkhead that allows the clamp system to be coupled to a robotic arm. The robotic arm supplies air and electricity through pneumatic and electrical ports, enabling operation of the clamp system. The air is routed to pneumatic cylinders, which power a pneumatic clamp mechanism that moves sliding clamp fixtures along tracks. The sliding clamp fixtures press a work piece against immobile clamp fixtures, allowing a work piece to be secured and held during welding. Presence of a work piece is detected by proximity sensors which are mounted into the fixture. The clamp system allows a robotic arm to grab a work piece from a supply area, initiate and complete welding of the work piece, and then release the work piece onto a discharge station for removal of the completed work piece.

19 Claims, 14 Drawing Sheets

(56) References Cited

U.S. PATENT DOCUMENTS

| | | | | |
|---|---|---|---|---|
| 3,600,746 A * | 8/1971 | Kostur | B29C 51/262 | 26/1 |
| 5,006,193 A * | 4/1991 | Quick | B25B 5/14 | 144/245.3 |
| 5,040,716 A * | 8/1991 | Stetz | B23K 37/053 | 228/42 |
| 5,105,515 A * | 4/1992 | Nelson | B25B 5/061 | 269/910 |
| 5,595,102 A * | 1/1997 | O'Grady | B23D 47/04 | 83/435.17 |
| 5,901,426 A * | 5/1999 | Okazaki | B23K 37/0443 | 269/329 |
| 8,800,981 B2 * | 8/2014 | Jeong | B62D 65/026 | 269/228 |
| 2002/0005608 A1 * | 1/2002 | Ausilio | B25B 5/006 | 269/32 |
| 2003/0015881 A1 * | 1/2003 | Neveu | B25J 15/0052 | 294/65 |
| 2003/0208893 A1 * | 11/2003 | Kilibarda | B23K 37/0443 | 29/407.01 |
| 2003/0214087 A1 * | 11/2003 | Grosso | B23Q 3/18 | 269/71 |
| 2005/0150103 A1 * | 7/2005 | Carasso | F16L 23/10 | 29/799 |
| 2007/0006462 A1 * | 1/2007 | Van Zile, III | B23K 37/0443 | 29/897.2 |
| 2011/0135436 A1 * | 6/2011 | Yeum | B25J 15/0061 | 414/729 |
| 2012/0039699 A1 * | 2/2012 | Ward | B25J 15/0052 | 414/792.7 |
| 2012/0056440 A1 * | 3/2012 | Yeum | B25J 15/0052 | 294/81.2 |
| 2012/0137490 A1 * | 6/2012 | Kweon | B23K 31/02 | 29/428 |
| 2012/0326374 A1 * | 12/2012 | Shelby | B21D 11/14 | 269/86 |
| 2013/0113149 A1 * | 5/2013 | Yeum | B23K 37/0443 | 269/59 |
| 2014/0015186 A1 * | 1/2014 | Wessel | B23Q 1/037 | 269/97 |
| 2014/0103591 A1 * | 4/2014 | Petit | B62D 65/18 | 269/55 |
| 2014/0165752 A1 * | 6/2014 | Lee | B23Q 1/527 | 74/89.17 |

* cited by examiner

CLAMP SYSTEM FOR WELDING APPLICATIONS

The current application claims a priority to the U.S. Provisional Patent application Ser. No. 61/900,756 filed on Nov. 6, 2013.

FIELD OF THE INVENTION

The present invention relates generally to a clamp system used as part of the welding process. The present invention is an aligning fixture that is used to securely hold a work piece during robotic welding applications and then quickly release after the welding is completed.

BACKGROUND OF THE INVENTION

The general process of welding consists of joining metals by way of applying heat, with the use of pressure or with the use of intermediate or filler metals having a high melting point. Welding is a very meticulous method due to the materials that the welding process undergoes. Safety and effectiveness are very important factors to consider while welding units. During the welding process, users must be ensured that their resources are secure, yet also have the ability to be multi-faceted and work through both automated and manual processes.

The present invention can substantially improve the welding process through a specific process. The present invention is an aligning and clamping fixture that is used to securely hold a work piece during robotic welding applications and then quickly release after the welding is completed.

DETAIL DESCRIPTIONS OF THE INVENTION

All illustrations of the drawings are for the purpose of describing selected versions of the present invention and are not intended to limit the scope of the present invention.

The present invention is an apparatus that allows for the alignment and clamping of work pieces in robotic welding applications. The present invention comprises a fixture plate 1, a bulkhead 2, a first clamp system 3, and a second clamp system 4. The fixture plate 1 serves as a support for the other components of the present invention. The bulkhead 2 allows the present invention to be coupled to other devices, such as a robotic arm. The first clamp system 3 and the second clamp system 4 allow the present invention to secure and release work pieces by clamping and unclamping them. Ultimately, the present invention allows a work piece to be secured for welding and released once the welding is completed.

The fixture plate itself comprises a first surface 11 and second surface 12, resulting in a planar configuration as visible in FIG. 1-FIG. 5. The first surface 11 supports the bulkhead 2, with the bulkhead 2 being adjacently connected to the first surface 11. The combination of the bulkhead 2 and the first surface 11 allows the present invention to be interfaced with existed devices, e.g. the aforementioned robotic arm. Different embodiments of the present invention may utilize different dimensions, such as those shown in FIG. 10-FIG. 14.

A number of embodiments may be utilized that allow the bulkhead 2 to interface with an existing apparatus. In the illustrated embodiment, the bulkhead 2 comprises a pneumatic port 21 and an electrical port 22. These ports allow for the transfer of fluids and electrical signals between a coupled apparatus and the present invention. More specifically, the pneumatic port 21 and the electrical port 22 allow interaction with components of the clamp systems, as later introduced and described. Furthermore, the bulkhead 2 may use various methods to couple the present invention with an appropriately equipped apparatus. As an example, in one embodiment the present invention is coupled by means of a vacuum seal produced between corresponding bulkheads. While this specific system of coupling is described, it is not meant to preclude the use of alternative methods in other embodiments of the present invention.

The second surface 12 supports the first clamp system 3 and the second clamp system 4, in turn allowing the present invention to interface with work pieces that require welding. These relations are illustrated via FIG. 1-FIG. 5. The first clamp system 3 and the second clamp system 4 themselves each comprise a rigid clamp fixture 51, a sliding clamp fixture 52, a track 54, a pneumatic cylinder 55, a pneumatic slide mechanism 56, and a proximity sensor 57. The track 54 allows movement of the sliding clamp fixture 52 with respect to the rigid clamp fixture 51, and is secured to the second surface 12 of the fixture plate 1. The track 54 itself is installed onto the second surface 12, providing a pathway for the sliding clamp fixture 52. With the track 54 mounted to the second surface 12, the sliding clamp fixture 52 is able to move with respect to the second surface 12 by virtue of being slidably engaged with the track 54. Positioned at an end of the track 54 opposite the sliding clamp fixture 52 is the rigid clamp fixture 51. With the rigid clamp fixture 51 placed at a terminal end 541 of the track 54, the sliding clamp fixture 52 can be moved towards or away from the rigid clamp fixture 51. This relation between the rigid clamp fixture 51 and the sliding clamp fixture 52 allows the present inventions to accommodate work pieces with varying dimensions; by simply moving the sliding clamp fixture 52 with respect to the rigid clamp fixture 51, different sized work pieces can be secured by the present invention. As the rigid clamp fixture 51 is meant to be stationary, it is affixed to the track 54.

Figure 1:
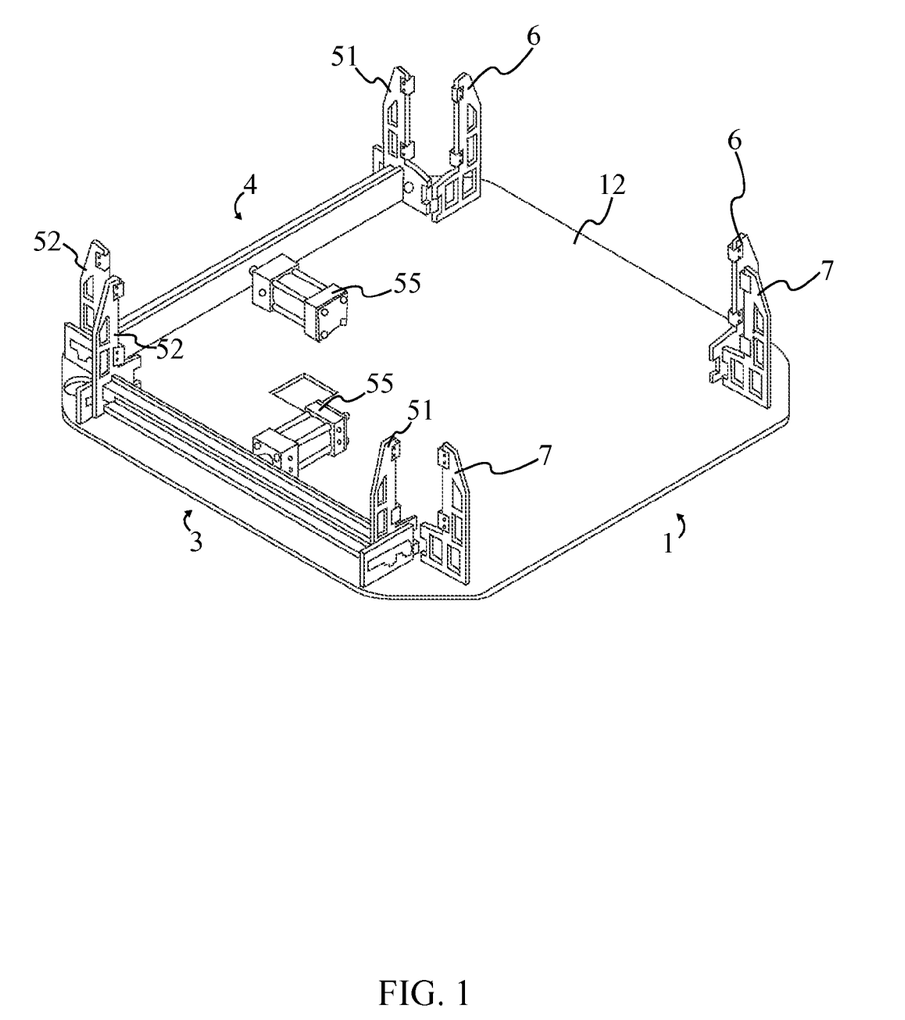
FIG. 1 is a top perspective drawing of the present invention.
Figure 2:
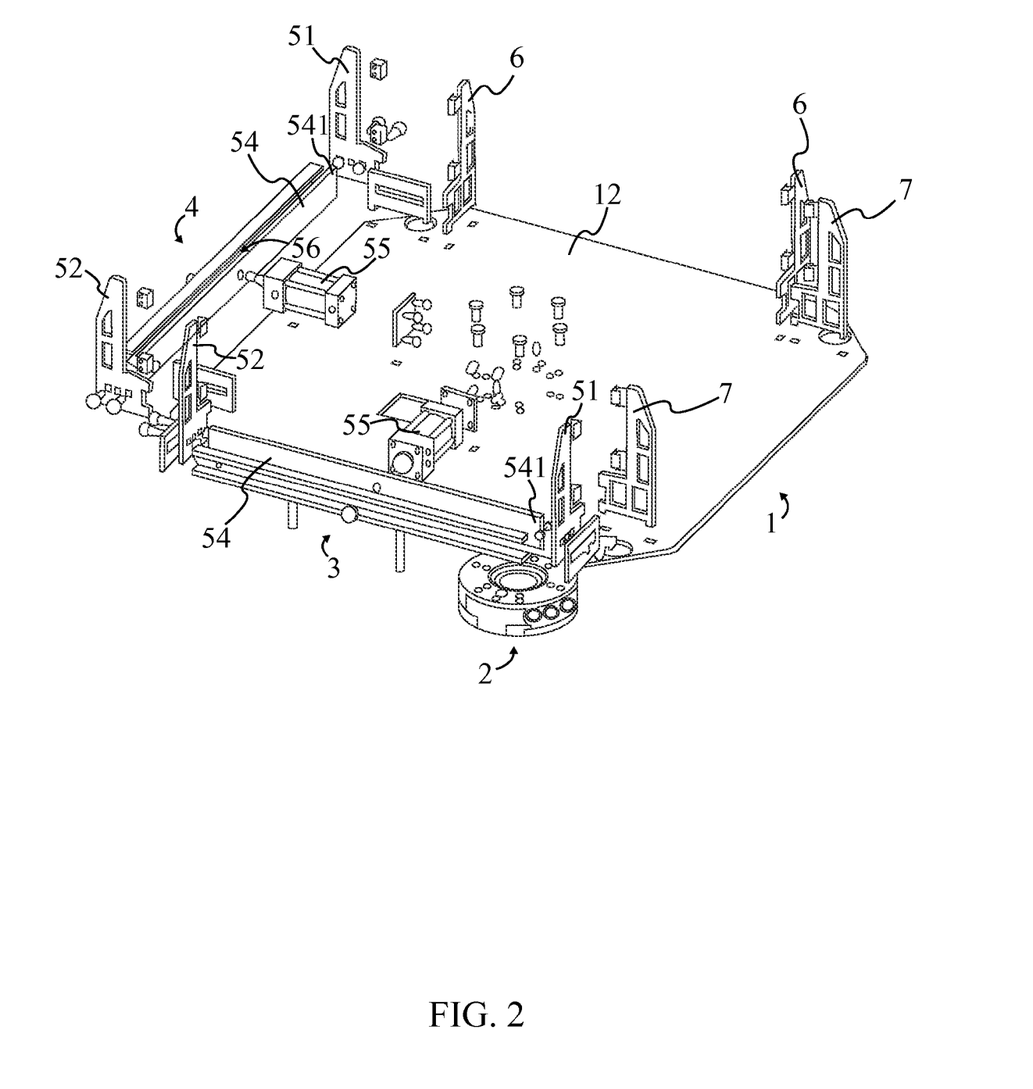
FIG. 2 is an exploded top perspective drawing of the present invention.
Figure 3:
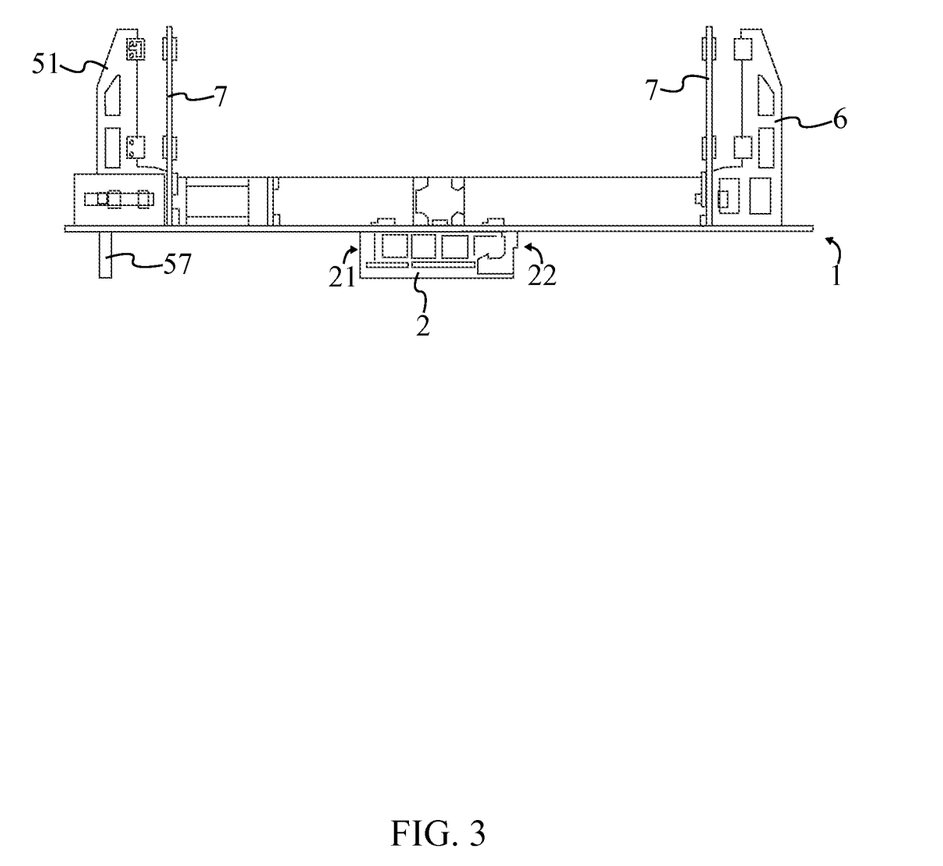
FIG. 3 is a lateral view drawing of the present invention.
Figure 4:
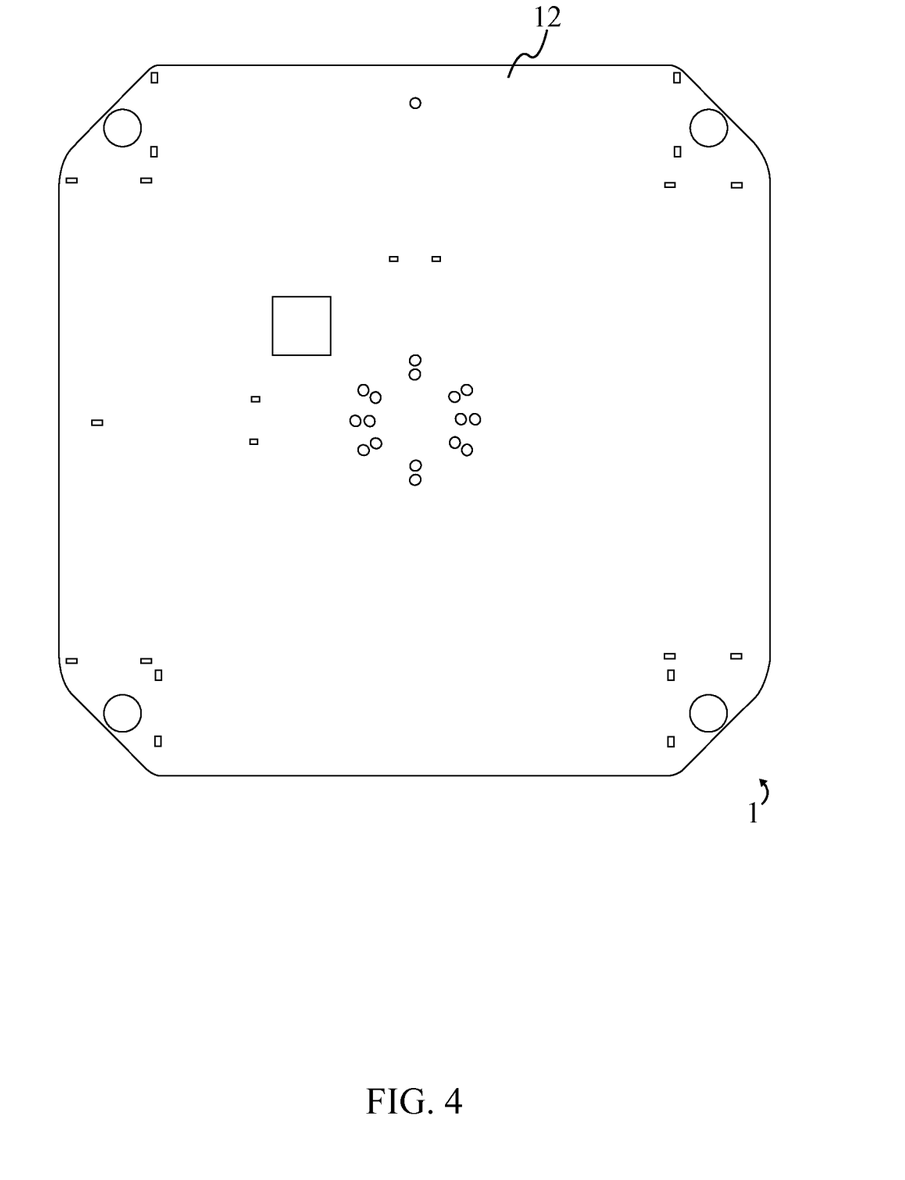
FIG. 4 is a top view drawing showing only the fixture plate of the present invention.
Figure 5:
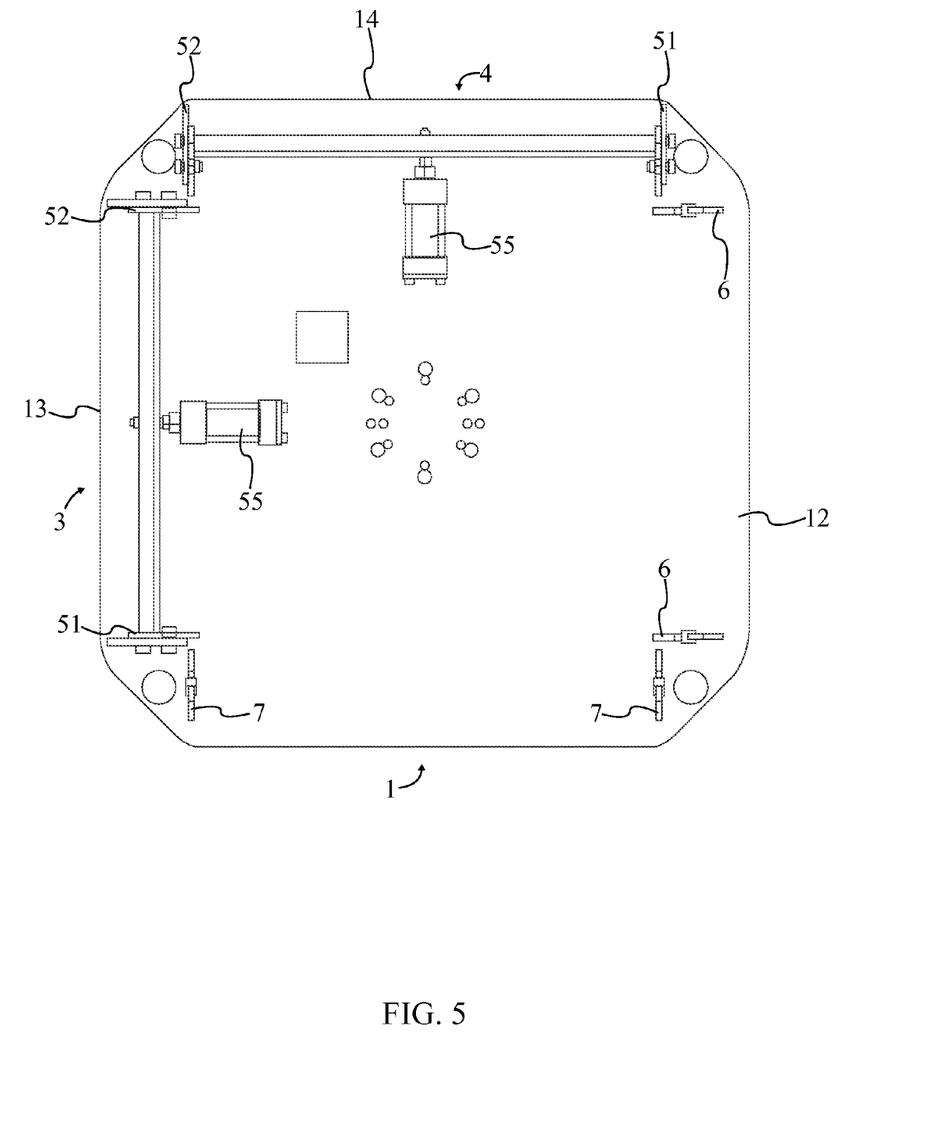
FIG. 5 is a top view drawing of the present invention.
Figure 6:
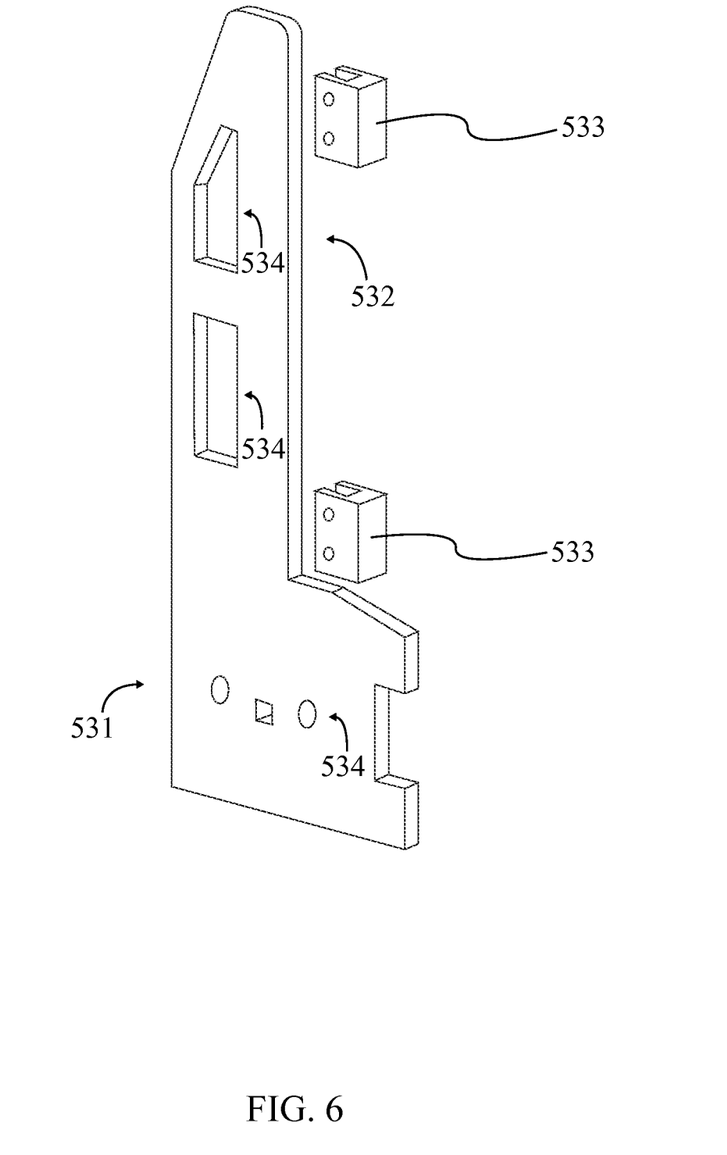
FIG. 6 is an exploded perspective drawing of a clamp fixture of the present invention.
Figure 7:
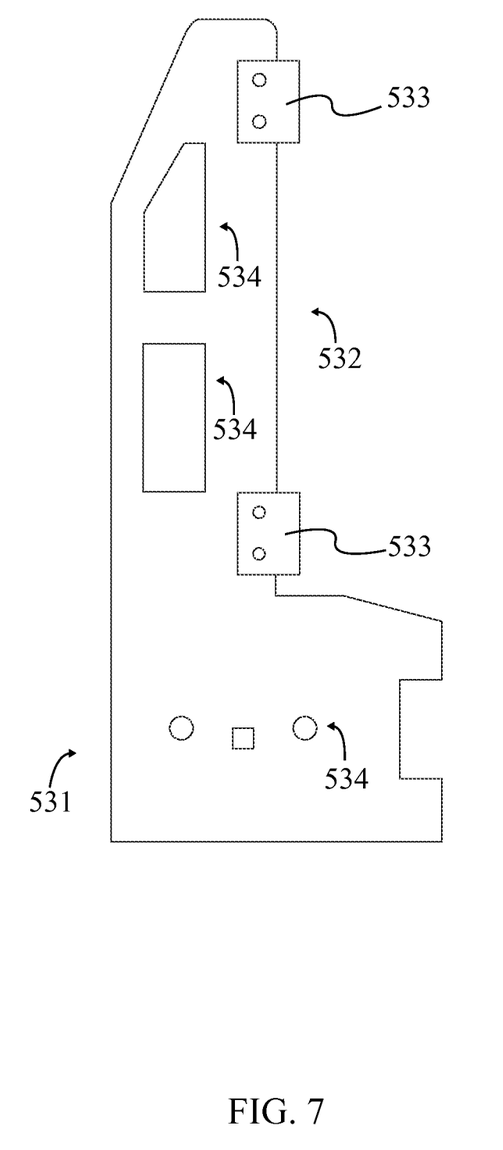
FIG. 7 is a side view drawing of the clamp fixture of the present invention.
Figure 8:
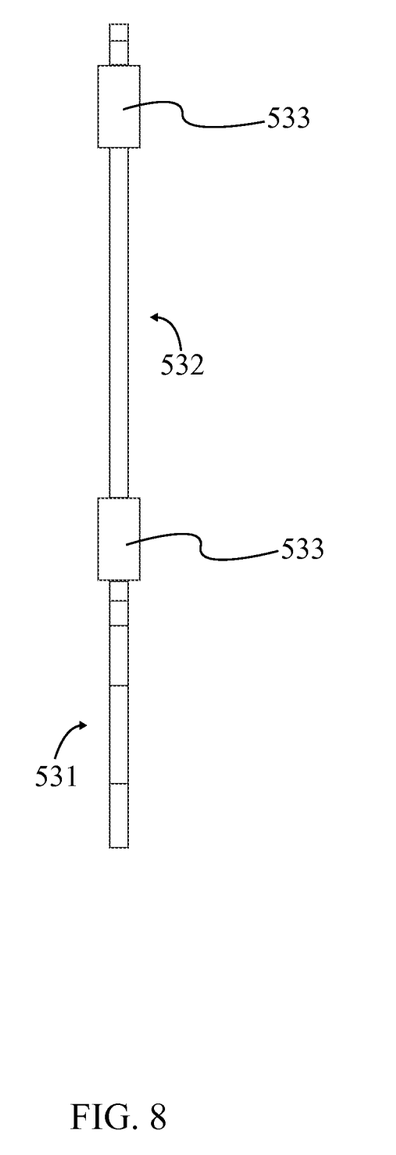
FIG. 8 is a front view drawing of the clamp fixture of the present invention.
Figure 9:
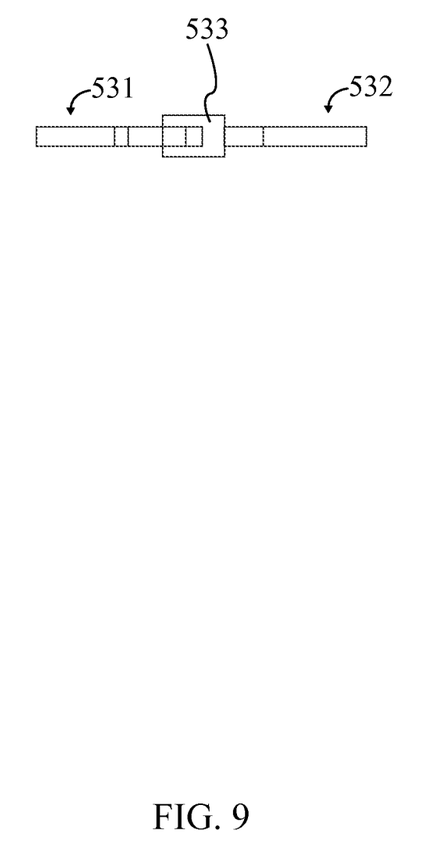
FIG. 9 is a top plan drawing of the clamp fixture of the present invention.
Figure 10:
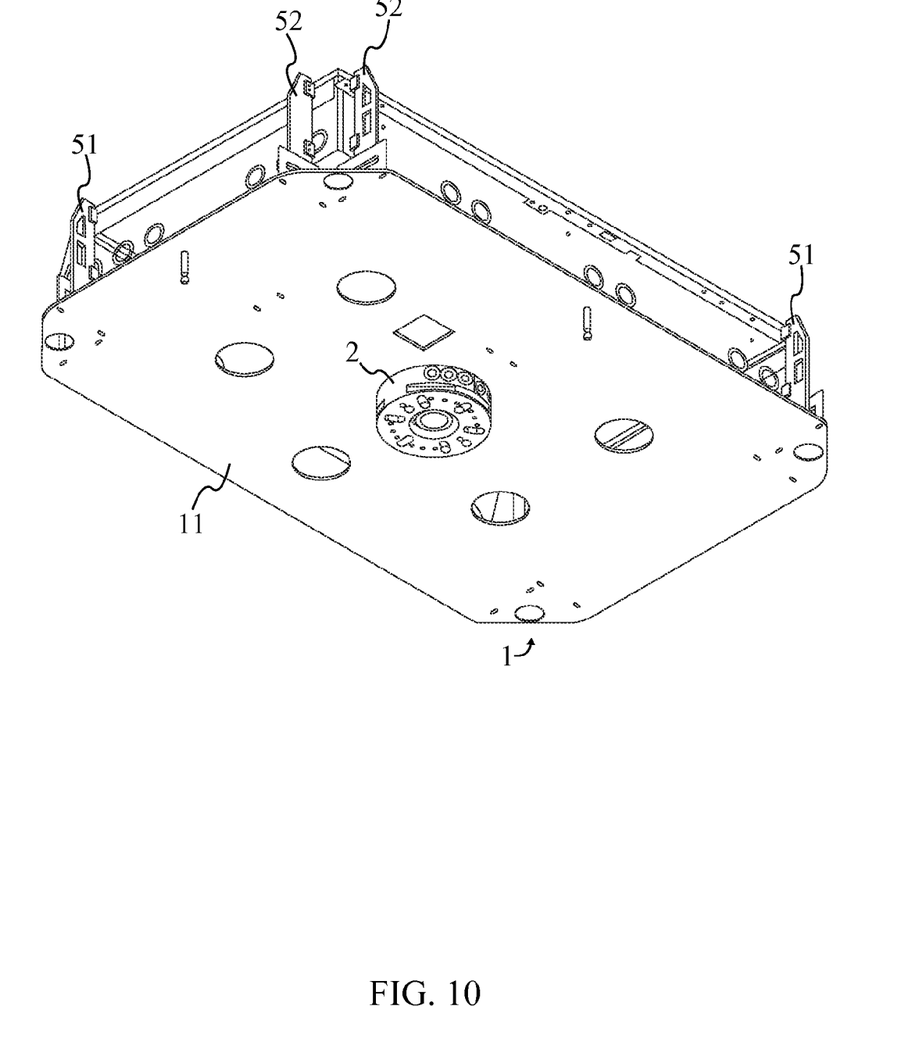
FIG. 10 is a bottom perspective view of the present invention.
Figure 11:
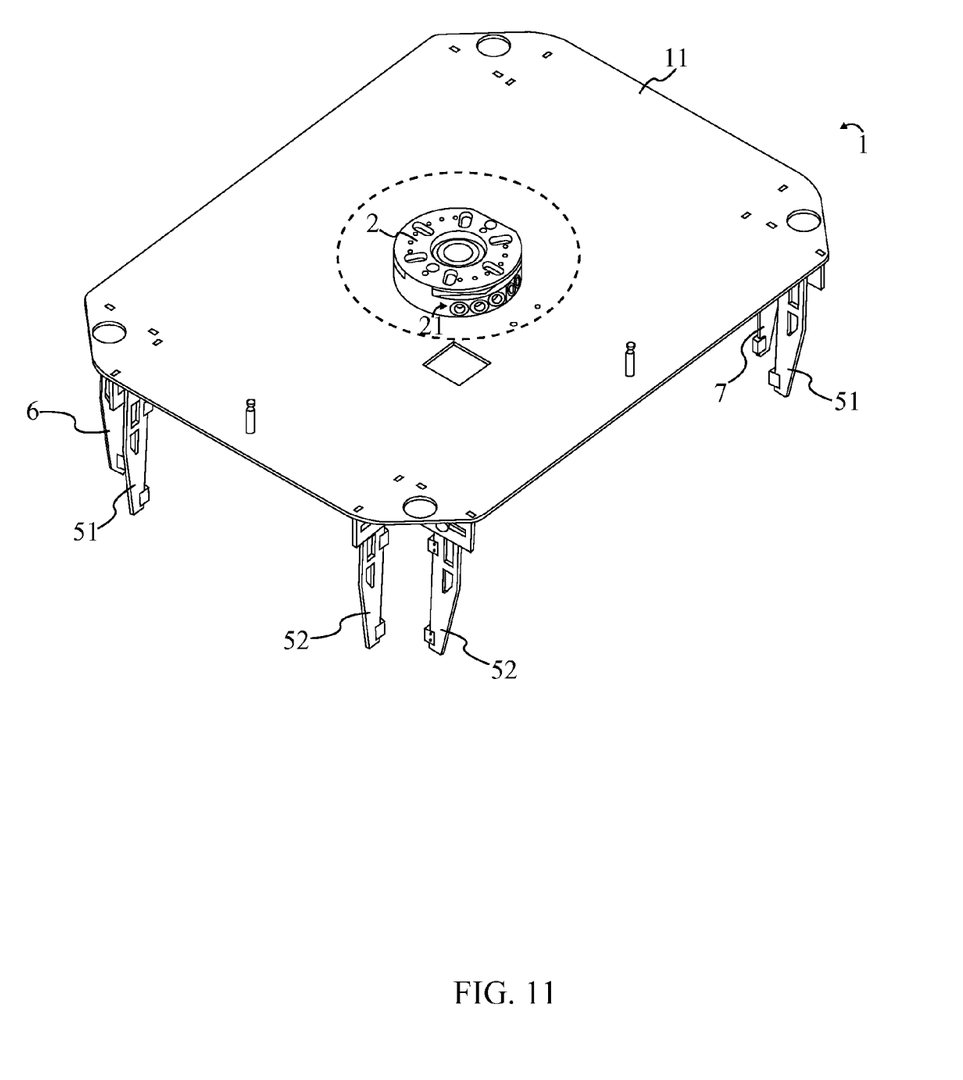
FIG. 11 is an alternative bottom perspective view of the present invention.
Figure 12:
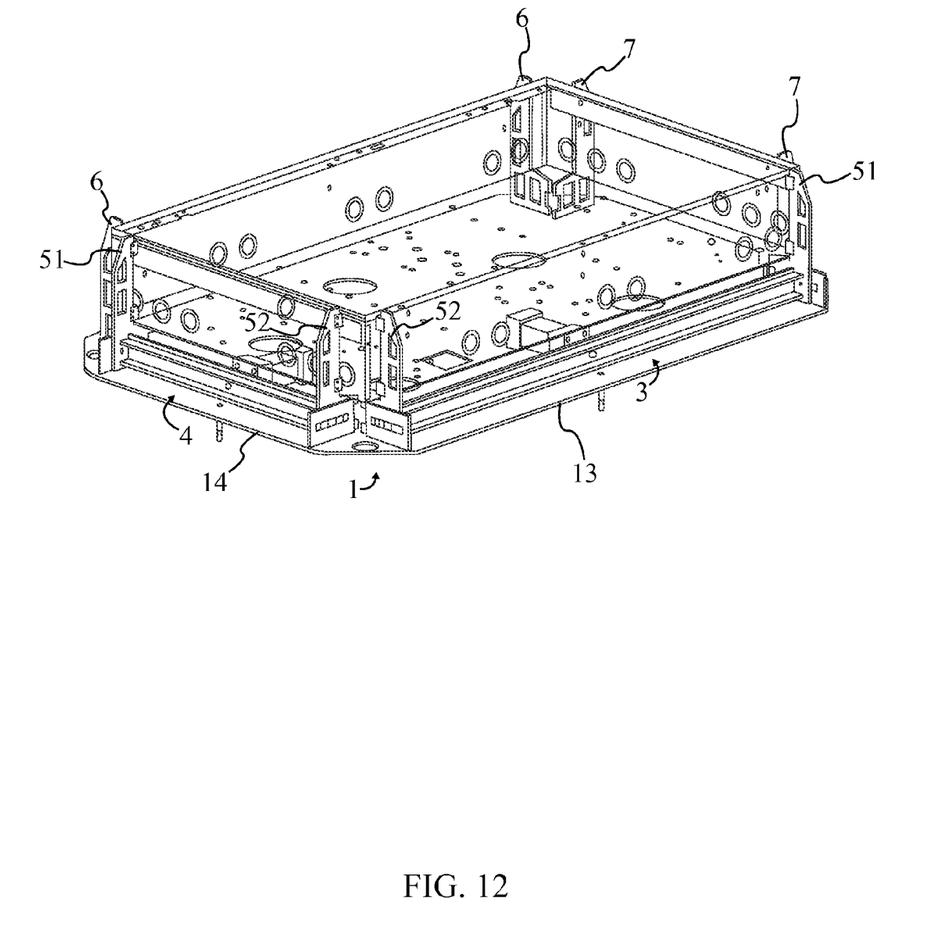
FIG. 12 is an additional perspective view of the present invention.
Figure 13:
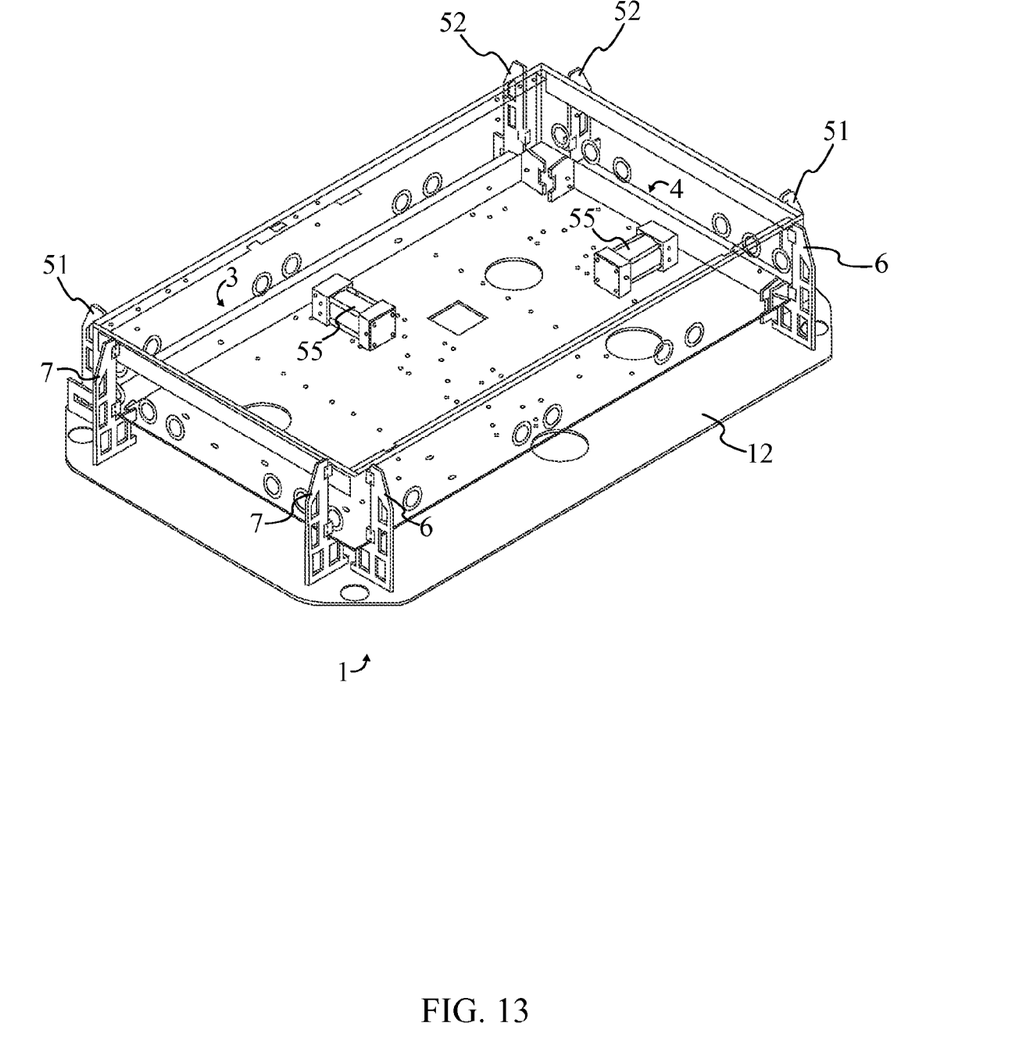
FIG. 13 is an elevated perspective view of the present invention.
Figure 14:
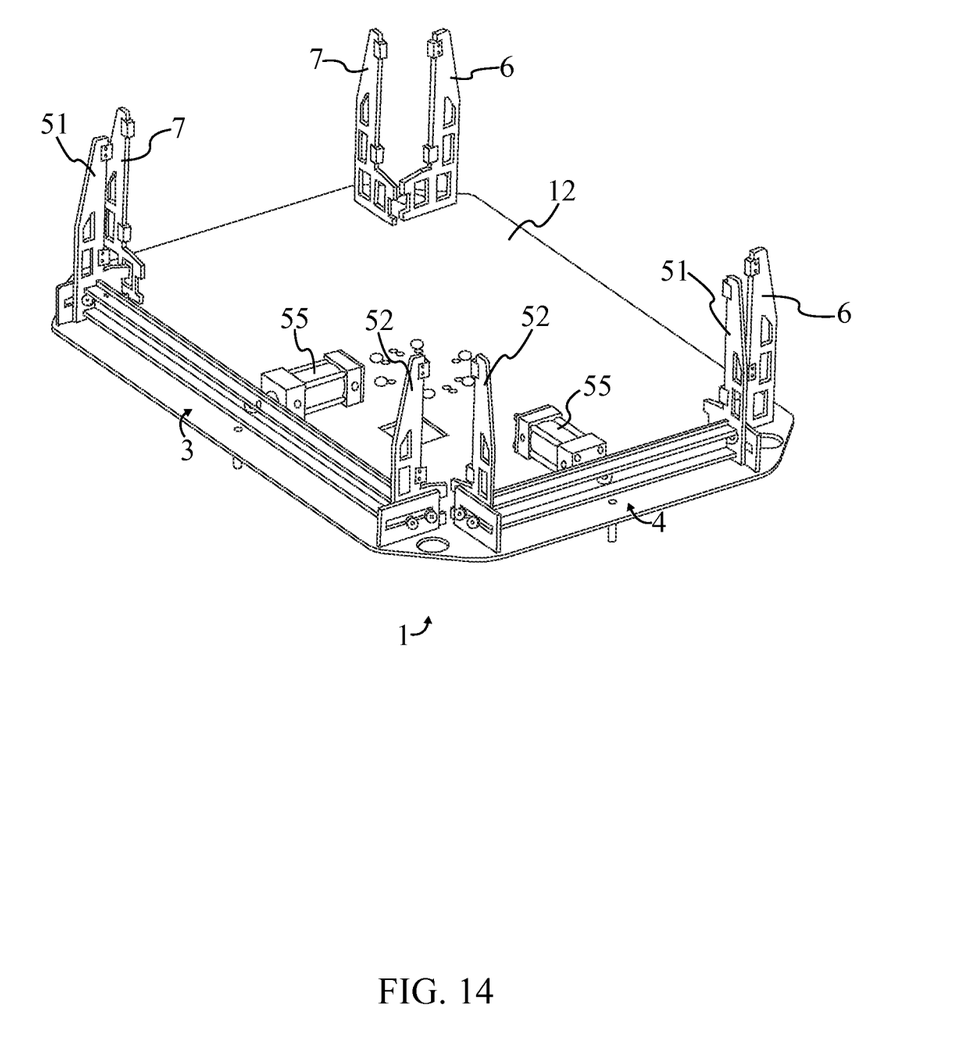
FIG. 14 is another elevated perspective view of the present invention.

Since the first clamp system 3 and the second clamp system 4 are provide to grip the perimeter surface of a work piece, they must be oriented so that each clamp system is able to secure a different axis of the work piece. Thus, as illustrated in FIG. 1, FIG. 2, and FIG. 5, the track 54 of the first clamp system 3 is positioned along a reference edge 13 (e.g. a long edge) of the fixture plate 1, while the track 54 of the second clamp system 4 is positioned along an adjacent edge 14 (e.g. a short edge). The resulting configuration positioned the track 54 of the first clamp system 3 along an axis which is perpendicular to the track 54 of the second clamp system 4, with the axes of the tracks 54 being coplanar.

In the described embodiment of the present invention, hydraulics are used to enable movement of the sliding clamp fixtures 52 along their respective tracks 54. The pneumatic port 21 routes fluids to the pneumatic cylinders 55 of the first clamp system 3 and the second clamp system 4. This fluid communication results in movement of the sliding clamp fixtures 52 along the tracks 54 without requiring direct (e.g. physical) manipulation by an operator. In a similar relationship, the electrical port 22 is electronically connected to the proximity sensor 57, allowing information to be exchanged between an operating apparatus (e.g. the robotic arm) and the present invention. In addition to being communicably coupled, the electrical port 22 and the proximity sensor 57 can be electrically connected, allowing power to be supplied to proximity sensors 57 that do not have a self contained power source. As there are two clamp systems provided in the present invention, the pneumatic port 21 routed to both the pneumatic cylinder 55 of the first clamp system 3 and the pneumatic cylinder 55 of the second clamp system 4. Similarly, the electrical port 22 is communicably coupled as well as electrically connected to both the proximity sensor 57 of the first clamp system 3 and the proximity sensor 57 of the second clamp system 4.

To allow the proximity sensor 57 to detect the presence of the work piece, the proximity sensor 57 is installed into the fixture plate 1 and positioned to be facing directly out of the fixture plate 1. This orientation, normal to the fixture plate 1, ensures that the proximity sensor 57 is capable of detecting the presence of a work piece which is ready to be clamped and welded. The proximity sensor 57 is positioned adjacent to the track 54 such that it is able to detect whether or not a work piece is above the corresponding track 54.

The pneumatic slide mechanism 56 serves to convert fluid pressure, as input from the pneumatic cylinder 55, into linear motion along the track 54. Essentially, the pneumatic slide mechanism 56 is what drives the sliding clamp fixture 52 along the track 54. The pneumatic slide mechanism 56 is connected along the track 54, ensuring that the sliding clamp fixture 52 has a full range of movement along the track 54. The pneumatic slide mechanism 56, is in fluid communication with the pneumatic cylinder 55, which supplies the necessary fluid flow. In simple terms, the pneumatic cylinder 55 acts as an intermediary source of fluid pressure, enabling fluid communication between the pneumatic port 21 and the pneumatic slide mechanisms 56 of the first clamp system 3 and the second clamp system 4. The pneumatic slide mechanism 56, in combination with the pneumatic cylinder 55 and pneumatic port 21, provides the present invention with the ability to convert fluid pressure into linear movement of clamp pieces.

In addition to the components thus far described, a first pair of fixed clamps 6 and a second pair of fixed clamps 7 are provided to help secure work pieces during the welding process. The first pair of fixed clamps 6 and the second pair of fixed clamps 7 provide stable supports that, in combination with the sliding clamp fixtures 52, hold work pieces in fixed positions for welding. A pair of fixed clamps is provided for each clamp system. Each pair of clamps, similar to the tracks 54, is installed into the fixture plate 1. More specifically, the first pair of fixed clamps 6 and the second pair of fixed clamps 7 are each adjacently connected to the second surface 12. The pairs of clamps are positioned opposite their corresponding clamp systems, i.e. at parallel edges of the fixture plate 1. The first pair of fixed clamps 6 provides a bracing component for the first clamp system 3, and is positioned opposite the first clamp system 3 across the second surface 12. Likewise, the second pair of fixed clamps 7 acts as a brace for the second clamp system 4 and is thus positioned opposite the second clamp system 4 across the second surface 12. Furthermore, the pairs of clamps are oriented to be parallel to their corresponding clamp systems, with the first pair of fixed clamps 6 being parallel to the first clamp system's 3 track 54 and the second pair of fixed clamps 7 being parallel to the second clamp system's 4 track 54. Thus, as the sliding clamp fixtures 52 are moved along their corresponding tracks 54, they press the work piece against the rigid clamp fixture 51 and associated pair of fixed clamps. In this way the work piece is securely held, at which point the welding process can be initiated. These additional clamps can be seen throughout FIG. 1-FIG. 5.

As the clamps and clamp fixtures of the present invention are designed to brace and secure a work piece for welding, they must be able to withstand the high temperatures that occur during welding. To provide the necessary tolerances, each clamp (i.e. the rigid clamp fixture 51, the sliding clamp fixture 52, the first pair of fixed clamps 6, and the second pair of fixed clamps 7) comprises a base 531 portion, a finger 532 portion, and at least one copper pad 533. The base 531 portion is where the clamps are connected to their supporting components, whether the track 54 (as is the case with the rigid clamp fixture 51 and the sliding clamp fixture 52) or the fixture plate 1 itself (as is the case with the first pair of fixed clamps 6 and the second pair of fixed clamps 7). The copper pads 533 are provided to directly interface with the work piece being welded; since copper has a high thermal conductivity, it is well suited for direct contact with the work piece. Since the copper pad 533 is provided to grip the work piece, they are adjacently connected to the finger 532 portion, as the finger 532 portion is the part that holds the work piece. Providing addition cooling ability is a plurality of ventilation holes 534, which traverse through both the base 531 portion and the finger 532 portion. The ventilation holes 534 allow for improved airflow around the clamp pieces and thus better heat transfer. The combination of the ventilation holes 534 and the copper pads 533 helps to ensure that high temperatures resulting from welding do not degrade or otherwise weaken the various clamp pieces. These clamp subcomponents are shown in FIG. 6-FIG. 9.

In the illustrated embodiment, multiple copper pads 533 are shown affixed to the finger 532 portion of each clamp piece. Different embodiments may choose to utilize more or fewer copper pads 533 without altering the function of the present invention. Additionally, while copper pads 533 are described, ultimately any heat resistant material may be used in place of copper.

The present invention, being intended for use in welding applications, is able to interface with a control apparatus via the bulkhead 2 as seen in FIG. 2. A corresponding bulkhead is provided for the control apparatus (e.g. robotic arm), that is able to couple with the bulkhead 2 of the present invention via vacuum seal. The corresponding bulkhead is also able to engage with the pneumatic port 21 and electrical port 22 of the invention's bulkhead 2, allowing for transfer of air pressures, vacuums, and electricity. The corresponding bulkhead and bulkhead 2 of the invention are aligned with each other via alignment shafts, which help guide them into an engaged and locked position.

Once the two bulkheads are mated to each other the robotic arm is capable of maneuvering the present invention. The robotic arm brings the present invention to a fixed location, from which a work piece is selected. After the present invention has been moved to the work piece, the robotic arm outputs a signal to a pneumatic switch in order to provide air pressure to the pneumatic cylinders 55 on the fixture plate 1. The air pressure allows the pneumatic cylinders 55 to actuate the pneumatic slide mechanism 56, resulting in movement of the sliding clamp fixtures 52 along their respective tracks 54. As the sliding clamp fixtures 52 move they press the work piece against the immobile clamp fixtures, thus clamping and securing the work piece between the clamp pieces of the present invention.

The proximity sensors 57 on the fixture plate 1 are used to detect the presence of the work piece, verifying that it is ready for welding. Once the proximity sensors 57 confirm that the work piece is in position, precision welding of the work piece commences. During the precision welding process the present invention ensures the work piece is secured and stable in order to assist with a flawless welding process.

After the welding process is completed the robotic arm moves the present invention and work piece to a discharge station. Once in position above the discharge station, a signal is sent to disengage the sliding clamp fixtures 52 from the work piece. The pneumatic system then releases pressure and the sliding clamp fixtures 52 move away from the work piece, allowing the work piece to be transferred to the discharge station. The proximity sensors 57 confirm the release of the work piece, at which point the cycle may be repeated; a new work piece may be selected, welded, and discharged through utilization of a robotic arm and the present invention.

Although the invention has been explained in relation to its preferred embodiment, it is to be understood that many other possible modifications and variations can be made without departing from the spirit and scope of the invention as hereinafter claimed.

What is claimed is:
1. A clamp system for welding applications comprises:
a fixture plate;
a coupling device;
a first clamp system;
a second clamp system;
the fixture plate comprises a first surface and a second surface;
the coupling device comprises a pneumatic port and an electrical port;
the first clamp system and the second clamp system each comprise a rigid clamp fixture, a sliding clamp fixture, a track, a pneumatic cylinder, a pneumatic slide mechanism, and a proximity sensor;
the coupling device being adjacently connected to the first surface;
the track being mounted to the second surface;
the pneumatic slide mechanism being connected along the track;
the rigid clamp fixture being mounted to the track;
the rigid clamp fixture being positioned at a terminal end of the track;
the sliding clamp fixture being slidably engaged with the track;
the rigid clamp fixture and the sliding clamp fixture each comprise a base portion, a finger portion, and at least one copper pad;
the base portion being positioned adjacent to the second surface;
the finger portion being positioned adjacent to the base portion opposite the second surface;
a plurality of ventilation holes traversing through the base portion and the finger portion; and
the at least one copper pad being adjacently connected to the finger portion, wherein the copper pad insulates against heat.

2. The clamp system for welding applications as claimed in claim 1 comprises:
the pneumatic port being in fluid communication with the pneumatic cylinder of the first clamp system; and
the pneumatic port being in fluid communication with the pneumatic cylinder of the second clamp system.

3. The clamp system for welding applications as claimed in claim 1 comprises:
the pneumatic cylinder of the first clamp system being in fluid communication with the pneumatic slide mechanism of the first clamp system; and
the pneumatic cylinder of the second clamp system being in fluid communication with the pneumatic slide mechanism of the second clamp system.

4. The clamp system for welding applications as claimed in claim 1 comprises:
the proximity sensor being mounted onto the fixture plate, adjacent to the track; and
the proximity sensor being oriented normal to the second surface.

5. The clamp system for welding applications as claimed in claim 4, wherein the proximity sensor can detect the presence of a work piece adjacent to the track.

6. The clamp system for welding applications as claimed in claim 1 comprises:
the electrical port being electrically connected to the proximity sensor of the first clamp system; and
the electrical port being electrically connected to the proximity sensor of the second clamp system.

7. The clamp system for welding applications as claimed in claim 1 comprises:
the electrical port being communicably coupled to the proximity sensor of the first clamp system; and
the electrical port being communicably coupled to the proximity sensor of the second clamp system.

8. The clamp system for welding applications as claimed in claim 1 comprises:
the pneumatic slide mechanism being in fluid communication with the sliding clamp fixture, wherein the pneumatic slide mechanism imparts movement of the sliding clamp fixture along the track.

9. The clamp system for welding applications as claimed in claim 1 comprises:
the track of the first clamp system being positioned along a reference edge of the fixture plate;
the track of the second clamp system being positioned along an adjacent edge of the fixture place; and
the track of the first clamp system being perpendicular to the track of the second clamp system.

10. The clamp system for welding applications as claimed in claim 1 comprises:
a first pair of fixed clamps;
a second pair of fixed clamps;

the first pair of fixed clamps being adjacently connected to the second surface;
the second pair of fixed clamps being adjacently connected to the second surface;
the first pair of fixed clamps being positioned opposite the first clamp system across the second surface;
the second pair of fixed clamps being positioned opposite the second clamp system across the second surface;
the first pair fixed of clamps being parallel to the track of the first clamp system;
the second pair of fixed clamps being parallel to the track of the second clamp system; and
the first pair of clamps being oriented perpendicular to the second pair of clamps.

11. The clamp system for welding applications as claimed in claim 10 comprises:
each of the first pair of fixed clamps and each of the second pair of fixed clamps comprises a fixed base portion, a fixed finger portion, and at least one fixed copper pad;
the fixed base portion being positioned adjacent to the second surface;
the fixed finger portion being positioned adjacent to the fixed base portion opposite the second surface;
a plurality of fixed ventilation holes traversing through the fixed base portion and the fixed finger portion; and
the at least one fixed copper pad being adjacently connected to the fixed finger portion, wherein the fixed copper pad insulates against heat.

12. A clamp system for welding applications comprises:
a fixture plate;
a coupling device;
a first clamp system;
a second clamp system;
a first pair of fixed clamps;
a second pair of fixed clamps;
the fixture plate comprises a first surface and a second surface;
the coupling device comprises a pneumatic port and an electrical port;
the first clamp system and the second clamp system each comprise a rigid clamp fixture, a sliding clamp fixture, a track, a pneumatic cylinder, a pneumatic slide mechanism, and a proximity sensor;
the coupling device being adjacently connected to the first surface;
the track being mounted to the second surface;
the pneumatic slide mechanism being connected along the track;
the pneumatic slide mechanism being in fluid communication with the sliding clamp fixture, wherein the pneumatic slide mechanism imparts movement of the sliding clamp fixture along the track;
the rigid clamp fixture being mounted to the track;
the rigid clamp fixture being positioned at a terminal end of the track;
the sliding clamp fixture being slidably engaged with the track;
the first pair of fixed clamps being positioned opposite the first clamp system across the second surface; and
the second pair of fixed clamps being positioned opposite the second clamp system across the second surface.

13. The clamp system for welding applications as claimed in claim 12 comprises:
the pneumatic port being in fluid communication with the pneumatic cylinder of the first clamp system;
the pneumatic port being in fluid communication with the pneumatic cylinder of the second clamp system;
the pneumatic cylinder of the first clamp system being in fluid communication with the pneumatic slide mechanism of the first clamp system; and
the pneumatic cylinder of the second clamp system being in fluid communication with the pneumatic slide mechanism of the second clamp system.

14. The clamp system for welding applications as claimed in claim 12 comprises:
the proximity sensor being mounted onto the fixture plate, adjacent to the track; and
the proximity sensor being oriented normal to the second surface, wherein the proximity sensor can detect the presence of a work piece adjacent to the track.

15. The clamp system for welding applications as claimed in claim 12 comprises:
the electrical port being electrically connected to the proximity sensor of the first clamp system; and
the electrical port being electrically connected to the proximity sensor of the second clamp system.

16. The clamp system for welding applications as claimed in claim 12 comprises:
the electrical port being communicably coupled to the proximity sensor of the first clamp system; and
the electrical port being communicably coupled to the proximity sensor of the second clamp system.

17. The clamp system for welding applications as claimed in claim 12 comprises:
each of the rigid clamp fixture, the sliding clamp fixture, the first pair of fixed clamps, and the second pair of fixed clamps comprises a base portion, a finger portion, and at least one copper pad;
the base portion being positioned adjacent to the second surface;
the finger portion being positioned adjacent to the base portion opposite the second surface;
a plurality of ventilation holes traversing through the base portion and the finger portion; and
the at least one copper pad being adjacently connected to the finger portion, wherein the copper pad insulates against heat.

18. The clamp system for welding applications as claimed in claim 12 comprises:
the track of the first clamp system being positioned along a reference edge of the fixture plate;
the track of the second clamp system being positioned along an adjacent edge of the fixture place; and
the track of the first clamp system being perpendicular to the track of the second clamp system.

19. The clamp system for welding applications as claimed in claim 12 comprises:
the first pair of fixed clamps being adjacently connected to the second surface;
the second pair of fixed clamps being adjacently connected to the second surface;
the first pair fixed of clamps being parallel to the track of the first clamp system;
the second pair of fixed clamps being parallel to the track of the second clamp system; and
the first pair of clamps being oriented perpendicular to the second pair of clamps.

* * * * *